United States Patent [19]

Pottorff

[11] 3,997,186

[45] Dec. 14, 1976

[54] MOTORCYCLE TOWING DEVICES OF FIFTH WHEEL TYPE

[76] Inventor: Marsh Pottorff, 1050, 36½ Lane, Pueblo, Colo. 81006

[22] Filed: June 23, 1975

[21] Appl. No.: 589,735

Related U.S. Application Data

[63] Continuation-in-part of Ser. No. 503,712, Sept. 6, 1974, abandoned.

[52] U.S. Cl. ............................... 280/402; 280/494
[51] Int. Cl.² ...................................... B62D 53/04
[58] Field of Search ............. 280/402, 491 B, 492, 280/493, 494, 292; 214/86 A

[56] References Cited

UNITED STATES PATENTS

| | | | |
|---|---|---|---|
| 2,212,958 | 8/1940 | Rea | 280/492 |
| 2,789,832 | 4/1957 | Zumwalt | 280/402 X |
| 3,212,595 | 10/1965 | Mathews | 280/492 X |
| 3,430,983 | 3/1969 | Jones | 280/292 X |
| 3,615,105 | 10/1971 | Harris | 280/402 X |
| 3,778,087 | 12/1973 | Kallenbach | 280/292 |

FOREIGN PATENTS OR APPLICATIONS 1,216,079  12/1970  United Kingdom ............... 280/402

*Primary Examiner*—M. H. Wood, Jr.
*Assistant Examiner*—R. Schrecengost
*Attorney, Agent, or Firm*—C. B. Messenger

[57] ABSTRACT

Various motorcycle towing devices are presented wherein the connection between the towing vehicle and a motorcycle or a carrier therefor is of a fifth wheel type inclusive of king bolt and turning plate or bolster plate components that permit turning movements about the vertically oriented king bolt while movements about horizontal axes are limited and controlled by the positioning of the bolster plate and the horizontal pivot support provided thereby. Separate embodiments provide a rigid connection from the bolster plate pivot support to the frame of a motorcycle or to the front axle thereof while the rear wheel of the motorcycle remains in contact with the ground to provide trailed support therefor; or alternately, the bolster plate pivot support is used with a trailer component having separate support wheels and a pivot linked frame that receives, supports and carries the motorcycle. All embodiments provide compact storage advantages with the trailer-carrier embodiment providing additional motorcycle handling advantages when the motorcycle and carrier combination is to be stored. The trailer-carrier itself further provides freestanding, folded, compact and upright storage features.

11 Claims, 6 Drawing Figures

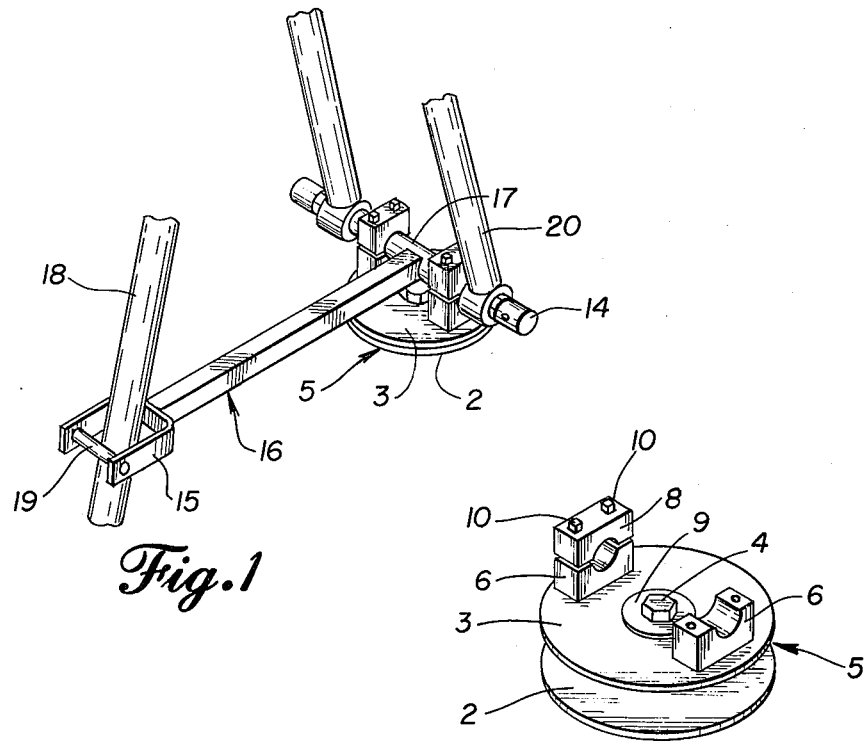
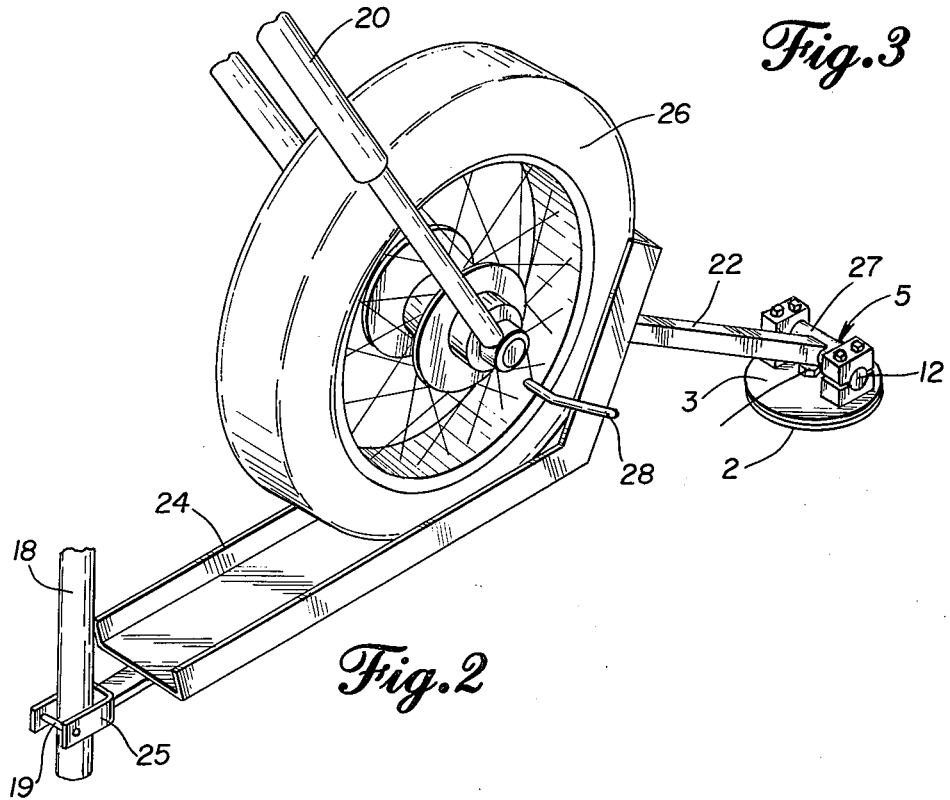

MOTORCYCLE TOWING DEVICES OF FIFTH WHEEL TYPE

CROSS-REFERENCE TO RELATED APPLICATION

The present application is a continuation-in-part of previous application Ser. No. 503,712 filed by the same inventor on Sept. 6, 1974, now abandoned in favor of the present application.

BACKGROUND OF THE INVENTION

Previously many different types of tow bars or trailer towing devices have been provided so that motorcycles could be trailed or carried behind a towing vehicle. Many previous arrangements have provided interconnection between the towing vehicle and the motorcycle so that the front of the motorcycle would be elevated and the rear wheel would stay in ground contact. Other towing devices are of conventional single axle trailer configuration, and it is presumed that the towing vehicle-to-trailer connections have included ball and socket, lunette and pintle hook, and perhaps other arrangements. For some earlier arrangements the front fork assembly of the motorcycle provides the only turn capability for preventing scuffing wear of wheels still in ground contact. In other arrangements, universal joint type connections are provided. Some of the earlier arrangements present serious handling and control problems, since the movement patterns for the towing vehicle and trailed carrier can be quite severe under certain terrain conditions.

The present invention is directed to a fifth wheel type of towing arrangement wherein a horizontal turning axis is in a position that is aligned with a vertical turning axis rather than in an offset position, and further wherein such vertical axis is not inordinately offset with respect to the rear support axle of the towing vehicle.

SUMMARY OF THE INVENTION

The present invention is directed to towing devices for motorcycles wherein a fifth wheel type of hitch is provided that is inclusive of a turn plate, a bolster plate, a king bolt interconnecting and providing turn capability therebetween and a pivot support on the bolster plate that provides for controlled pivotal movements about a horizontal axis that is in an aligned position with respect to the axis of the king bolt. The bolster plate pivot support is connected by rigid frame elements to the frame of the motorcycle in a manner whereby turning movements of the front wheel of the motorcycle with respect to its frame are avoided. In first embodiments, the trailing wheel of the motorcycle is in ground contact, but the motorcycle frame is constrained to follow the bolster plate pivot support. In a preferred embodiment a trailer frame is provided that has separate support wheels. These separate support wheels and the trailer and motorcycle frames are all constrained to follow said bolster plate pivot support.

All of the apparatus embodiments have convenient storage characteristics, with the separate trailer component being of a folding frame type of construction which permits upright freestanding storage or compact storage and improved handling features when the carrier is to be transported between points of use.

BRIEF DESCRIPTION OF THE DRAWINGS

FIG. 1 is a perspective illustration showing a first embodiment of the invention, FIG. 2 is a perspective illustration showing a second embodiment of the invention wherein the motorcycle is carried with the front wheel left in place, FIG. 3 is a perspective drawing showing components of the fifth wheel type connection in partially disassembled relationship.

DESCRIPTION OF THE PREFERRED EMBODIMENTS

Figure 4:
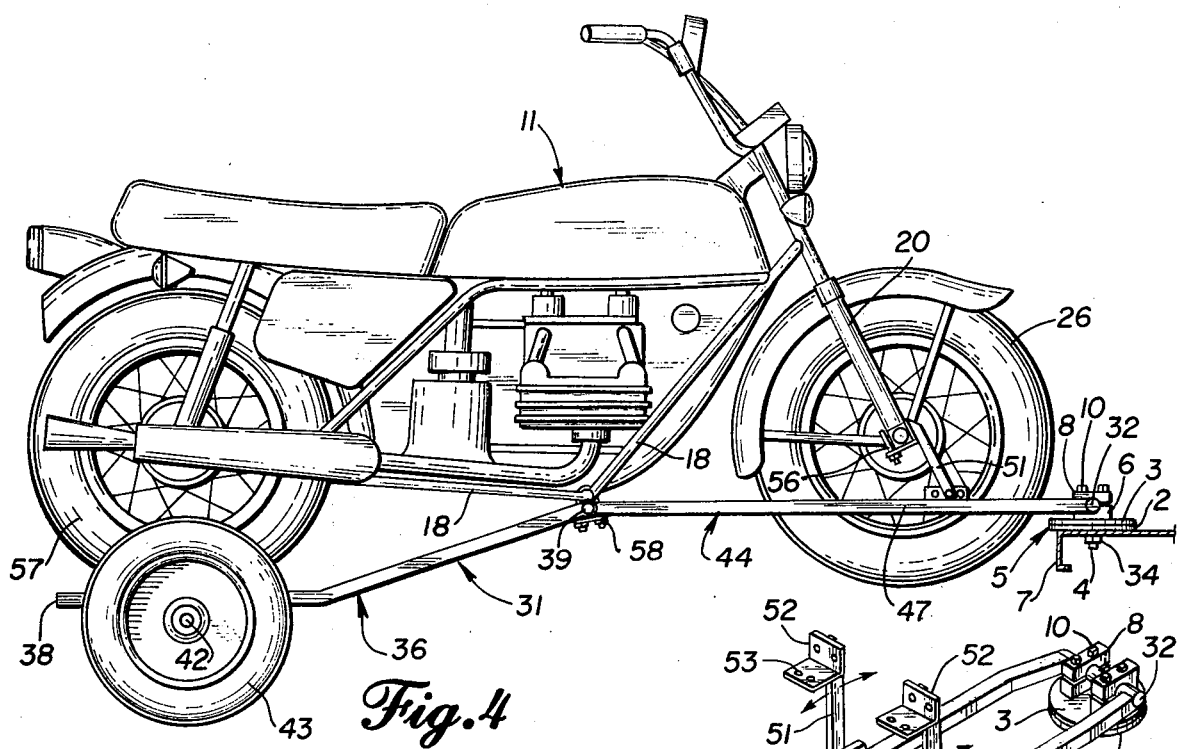
FIG. 4 is a side elevation of a wheeled trailer-carrier configuration.
Figure 5:
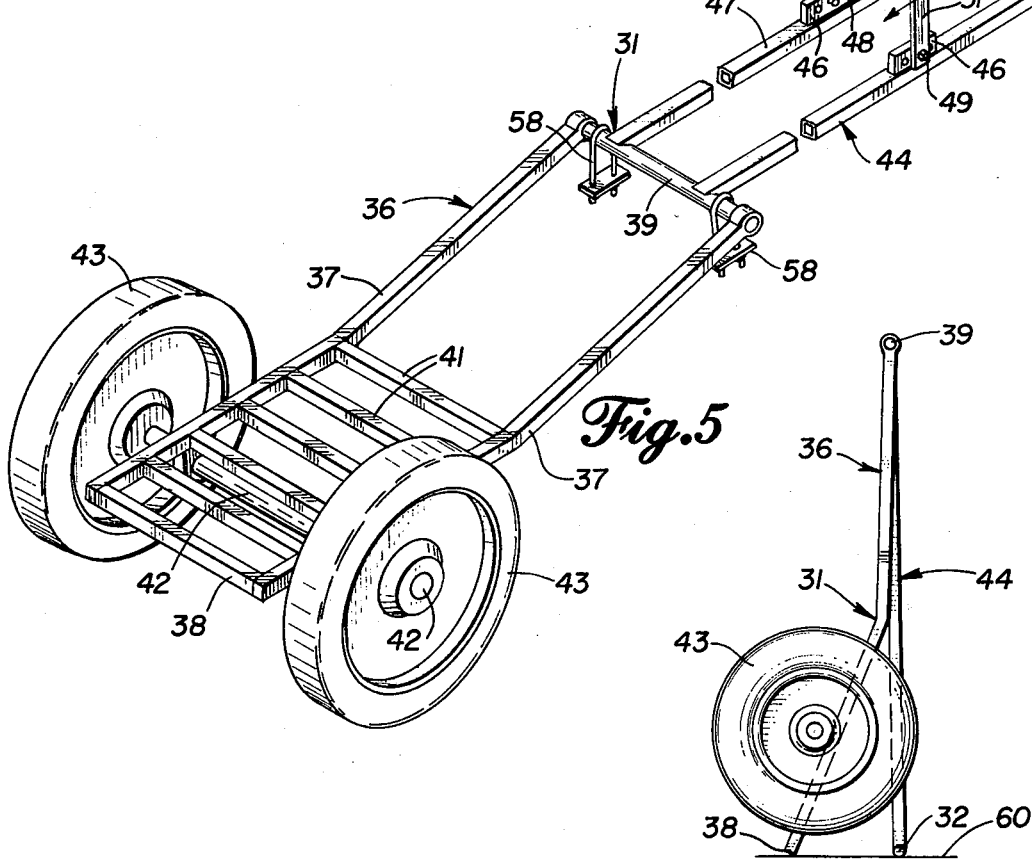
FIG. 5 is a perspective drawing showing additional features of said trailer-carrier.
Figure 6:
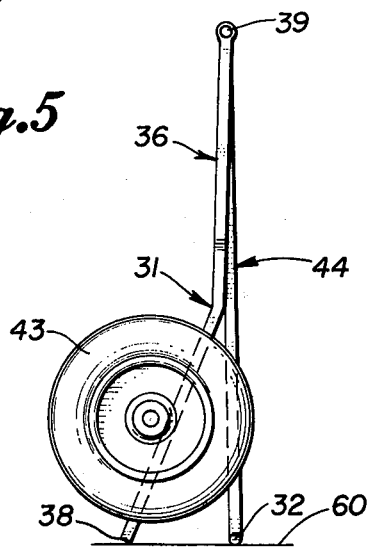
FIG. 6 is a side elevation of said trailer-carrier embodiment showing the freestanding storage features thereof.

FIGS. 1 through 5 show features of a fifth wheel hitch assembly 5. The components include circular steel plates identified as a support or turn plate 2 and a bolster plate 3. Each of the plates has a central opening (not shown) through which a king bolt 4 extends. The lower end of the king bolt is threaded to receive a lock nut 34 which may be adjustably secured to the king bolt 4 after it is passed through the bumper 7 or other frame attached component of the towing vehicle. The torque applied to the king bolt 34 should be such that turn plate 2 is securely held in position on the bumper 7 or other rigid structure of the vehicle, while the bolster plate 3 is still permitted to rotate with respect to turn plate 2 and/or the king bolt 4. In order to better assure such free turning movement, a thrust washer 9 can be applied beneath the head of the king bolt for contact with the top surface of the bolster plate 3. These pillow block components 6 and the cap blocks 8 secured in place by the cap screws 10 provide a cylindrical journal adapted to pivotally receive a pivot pin that may be a motorcycle axle type component 14 as shown in FIG. 1, a pivot support 12 as shown in FIG. 2, or a front pivot support bar 32 as shown in FIGS. 4, 5 and 6.

For all embodiments of the invention, the motorcycle towing attachment or trailer-carrier can be detached from the fifth wheel assembly 5 by removal of the cap screws 10. Alternately, the entire towing device, inclusive of the fifth wheel assembly 5, can be removed from the towing vehicle by removing the king bolt 4. Essentially, the fifth wheel assembly 5 used in connection with all the towing device embodiments of the invention is of the same general type construction, configuration and assembly. Relative motion is provided between the supporting turn plate 2 and bolster plate 3 so that the bolster plate can be turned about the vertical axis provided by the king bolt 4. Turning movements of the pivot supports or pins 12, 14 or 32 about horizontal axes are limited and controlled by the pillow block journals. The axis defined by such pillow block journals and the axis of king bolt 4 intersect one another at ninety degrees, and it is desirable that no offset is provided. Since these axes are not offset one with respect to the other, the particular orientation of the bolster plate 3 when the towing device is attached is not important.

For a first embodiment of the invention as shown in FIG. 1, the pivot support pin 14 is rotatably secured in the journals of the bolster plate 3. For this embodiment it is preferred that the pivot pin 14 will be of a size to pass through the wheel axle journals provided by the front forks 20 of the motorcycle. The pivot support pin 14 should also be of a length to be engaged through the fork journals as shown. A tow bar frame 16 having a hollow cross head 17 that is also engaged about the pivot support pin 14 extends rearwardly from the fifth wheel assembly 5. A yoke 15 at the rear of the tow bar frame 16 is engaged about a forward frame component 18 of the motorcycle, and a locking pin 19 is inserted to hold the tow bar frame 16 engaged with the motorcycle frame 18. With this arrangement the rear wheel of the motorcycle will be left in contact with the supporting ground, and the motorcycle will be trailed behind the towing vehicle with the necessary towing forces being transmitted by the tow bar frame 16 and in lesser measure by the pivot support pin 14. The cross head 17 and the yoke 15 essentially limit any free turning of the motorcycle forks 20 with respect to the frame 18, and, accordingly, the rear wheel to the motorcycle will be caused to trail behind the fifth wheel assembly 5 and its pivot support pin 14. The cross head and tow bar frame combination thus provided avoids the difficulties experienced with other types of motorcycle towing apparatus where the front wheel of the motorcycle is still free to turn about the rearwardly inclined turning axis of the front forks. Such freedom contributes to the racking of the motorcycle frame when certain terrain conditions and towing vehicle turning requirements are encountered.

A second embodiment of the invention is shown in FIG. 2. A main feature of this second embodiment is the fact that the front wheel 26 of the motorcycle does not have to be removed from the front fork assembly 20. For this installation a tow bar 22 again extends rearwardly from a front cross head 27 that is pivotally disposed about a pivot support 12. The tow bar assembly 22 includes a channel iron component 24 having separate pieces joined together at an angle and adapted to receive the tire of the front wheel 26. The front wheel is held in position in the channel component by a fastener 28 which is engaged about the front wheel 26 and a portion of the channel assembly 24. At its rearward extent the tow bar assembly 22 is again provided with a bifurcated yoke 25, and the yoke is again held to the motorcycle frame 18 by a lock pin 19. For this embodiment of the invention the rear wheel of the motorcycle stays in contact with the supporting ground, and the entire motorcycle is trailed behind the towing vehicle at positions and angles that are controlled by the disposition of the vertical and horizontal axes of the fifth wheel assembly 5 as exemplified by the king bolt 4 and pivot support 12. The front wheel of the motorcycle and the supporting forks 20 are constrained by the channel assembly 24, and, accordingly, turning movements of the forks with respect to the remaining frame components 18 of the motorcycle are beneficially limited.

Features of a futher and preferred embodiment of the invention are shown in FIGS. 4 through 6. In this embodiment of the invention the motorcycle 11 is disposed on a trailer-carrier assembly 31. The trailer-carrier 31 essentially has a pivotally linked type of frame that is adapted for engagement to the frame 18 of the motorcycle 11. The main frame 36 of trailer-carrier 31 has longitudinal side frames 37 that are joined together in spaced apart relationship by a rear frame piece 38, a front cross pivot 39 and intermediate cross members 41. A rear axle 42 is disposed beneath the rear frame 36, and paired wheels 43 are carried on the axle for free turning movement. The axle and wheels hold the main frame 36 above the supporting ground. A towing extension 44 extends forwardly from the main frame and its front cross pivot 39. Such cross pivot 39 provides the interconnection between the towing extension 44 and the main frame 36. The pivotal joinder illustrated makes it possible for the towing extension 44 and the main frame 36 to be disposed at various alternate angles one with respect to the other when different motorcycles are to be accommodated and also when the trailer-carrier 31 is to be stored. The forwardly disposed towing extension 44 has side frames 47 that are narrowed at the front end to engage the pivot support bar 32. The support bar 32 is itself designed for engagement in the journals 6–8 provided by bolster plate 3. At an intermediate point along the front side frames 47 adjustment blocks 46 are provided. These blocks have a plurality of openings 48 through which bolts 49 may be selectively disposed. Front fork support elements 51 are joined to the front side frames 47 and blocks 46 by the through bolts 49. If the bolts 49 are properly positioned, the fork support elements 51 will be disposed in line with the front fork assembly 20 of the motorcycle 11. Angle plates 52 at the free ends of the fork support elements 51 are provided with a plurality of holes 53 through which U bolts 56 or other fasteners may be extended. The U bolts or other fasteners are provided for engagement with the front wheel axle of the motorcycle, other parts related to the front axle, or other structural components of the motorcycle positioned adjacent the lower ends of the fork assembly 20. For many motorcycles the bars that support the fenders are of substantial strength, and U bolts 56 could, accordingly, be fastened about these fender bars at a position close to the front wheel axle, as shown. If the positioning of the fork support elements 51 is properly regulated with respect to the adjustment blocks 46, the motorcycle will be supported by its front fork assembly 20. Since such front fork assemblies usually provide shock struts, the motorcycle will have at least the same protection from road shocks when carried in this manner as it would have in normal usage.

The rear wheel 57 of the motorcycle is carried on top of the rear frame 36 and its cross members 41. Here again the rear suspension system of the motorcycle provides protection from road shocks that are transmitted by the wheels 43 and axle 42. In addition to the attachment provided by the forwardly disposed fork support elements 51, the main frame 18 of the motorcycle is held in engagement with the front cross pivot 39 by U bolt clamps 58. When these clamps 58 are engaged to the main frame 18 of the motorcycle at a position near the engine and about the front cross pivot 39, the motorcycle 11 will be securely held on the trailer-carrier 31. Usually no additional attachments or sway braces are necessary to hold the motorcycle in upright position or to withstand lateral loadings that might tend to tip the motorcycle and its trailer-carrier. Actually the trailer-carrier can be of rather narrow construction with the main frame 36 having a total width of approximately 14 inches. The stability of such configuration with a tread width for the rear wheels 43 of approximately 19 inches has been found to be quite adequate for carrying motorcycles of larger size and, accordingly, of considerable weight. The experienced stability is, of course, in large measure dependent on the fifth wheel assembly itself and its mating plate type of construction.

The narrow configuration for the trailer-carrier 31 makes it possible for a single towing vehicle to trail a plurality of trailer-carriers with separate motorcycles disposed thereon. For such usage a plurality of fifth wheel assemblies 5 are attached to the towing vehicles at spaced apart positions, and separate trailer-carriers are joined to the separate fifth wheel assemblies. Each of the trailer-carriers and its attached motorcycle will then follow its respective fifth wheel assemblies with the movement patterns of the separate trailer-carriers being regulated by the relative dispositions of the horizontal and vertical axes of the fifth wheel assemblies to which they are attached.

While the linked frame configuration is primarily provided so that the trailer-carrier 31 will be adapted for use with motorcycles of various size and length, the same linked frame configuration makes it possible to conveniently transport or store the trailer-carrier 31. When the trailer-carrier 31 is not being used to carry a motorcycle, it can be folded to a compact size, and it then can be stored and carried in the trunk of conventional automobiles. If the carrier is not in use, it can be folded to the configuration shown in FIG. 6. For this storage configuration the length of the towing extension 44 and the effective length of the main frame 36 are cooperatively regulated so the carrier can be placed in the upright configuration illustrated. In such storage position the wheels 43 are raised out of contact with the supporting floor 60 by the rear frame 38 and the forward pivot support bar 32. In this storage configuration, trailer-carrier 31 takes up a minimum of floor space, and since the wheels are out of contact with the floor, the stability is improved.

On many occasions a motorcycle that is to be stored will be handled while it is still attached to its trailer-carrier. Since most of the weight of the motorcycle can be carried by the rear wheels 43, a person can hold the forward end of the trailer-carrier in elevated position and move the entire trailer-carrier and motorcycle combination to a desired storage placement. In connection with such maneuvers, the trailer-carrier 31 is in effect used in the manner of a wheelbarrow. If the rear wheel of the motorcycle is behind the rear supporting axle 42, the total load can be effectively counterbalanced to improve the ease of handling. For such wheelbarrow type usage, the front pivot support bar 32 becomes a convenient operator handle. If the motorcycle is separated from the trailer-carrier, the same front support bar 32 or the front cross pivot 39 can be similarly used as a handle when maneuvering the trailer-carrier itself.

I claim:
1. A fifth wheel type of towing device for trailing motorcycles behind a towing vehicle wherein the motorcycle has a main frame associated with the pneumatic tired rear wheels thereof and a front assembly inclusive of front forks and wheel that normally moves pivotally with respect to said main frame comprising a turn plate for disposition on the towing vehicle and providing a flat surface disposed in a horizontal position, a bolster element positioned for contact with the flat surface of said turn plate, a king bolt at a normal disposition with respect to said turn plate and bolster and providing a vertically disposed turning axis for permitting relative rotation between said turn plate and bolster about said vertical axis, journals on said bolster establishing a horizontal turning axis adjacent said turning plate and king bolt, a pivot support element for engagement to said journals and providing therewith rotational freedom of movement about the journal axis, a first frame element for said towing device extending rearwardly from said pivot support with said first frame element, accordingly, being rotatably movable about the journal positioned horizontal axis and the king bolt positioned vertical axis, clamp means for interengaging said first frame element and the main frame of said motorcycle whereby the main frame of said motorcycle is constrained to move with said first frame element, means constraining the front assembly of said motorcycle to prevent the normal pivotal movements thereof whereby the motorcycle is constrained to follow said pivot support, a rear frame for said towing device, a cross pivot for pivotally interconnecting said first frame element and said rear frame, support wheels for said rear frame to provide a trailing device of trailer configuration, and means on said rear frame for engagement beneath the rear tire and wheel of said motorcycle for the support thereof whereby the complete rear suspension system of said motorcycle inclusive of the pneumatic tire and the support wheels of said rear frame cooperatively withstand road shocks that might be encountered.

2. The towing device as set forth in claim 1 wherein said clamp means are disposed at said cross pivot.

3. The towing device as set forth in claim 1 wherein said rear frame extends rearwardly past said support wheels, and said rear frame and first frame element are of substantially equal lengths and foldable about said cross pivot whereby the towing device may be stored in upright position with the support wheels out of ground support contact.

4. The towing device as set forth in claim 1 wherein the means constraining the front assembly of said motorcycle comprises front fork support elements disposed on said first frame element for contact the front assembly of said motorcycle.

5. The towing device as set forth in claim 4 wherein said fork support elements are adjustably movable along the length of said first frame element whereby motorcycles of various size may be accommodated.

6. The towing device as set forth in claim 4 wherein said clamp means are disposed at said cross pivot and are engaged to the main frame of said motorcycle and further comprising fasteners for joining said front fork support to the front assembly of said motorcycle whereby pivotal movement between said front frame element and rear frame about said cross pivot is limited and the towing device can alternately be used to carry said motorcycle when attached to the fifth wheel assembly and the towing vehicle or to conveniently move the motorcycle to storage positions when detached therefrom.

7. A towing device for trailing motorcycles behind a towing vehicle wherein the motorcycle has a main frame associated with the pneumatic tired rear wheels thereof and a front assembly inclusive of front forks and wheel that normally moves pivotally with respect to said main frame comprising a hitch element for engagement to the towing vehicle and providing a pivot support for said towing device, a first frame element for said towing device extending rearwardly from said pivot support with said first frame element, accordingly, being rotatably movable about said hitch element, clamp means for interengaging said first frame element and the main frame of said motorcycle whereby the main frame of said motorcycle is constrained to move with said first frame element, means constraining the front assembly of said motorcycle to prevent the normal pivotal movements thereof whereby the motorcycle is constrained to follow said pivot support hitch element, a rear frame for said towing device, a cross pivot for pivotally interconnecting said first frame element and said rear frame, support wheels for said rear frame to provide a trailing device of trailer configuration, and means on said rear frame for engagement beneath the rear tire and wheel of said motorcycle for the support thereof whereby the complete rear suspension system of said motorcycle inclusive of the pneumatic tire and the support wheels of said rear frame cooperatively withstand road shocks that might be encountered 8. The towing device as set forth in claim 7 wherein said clamp means are disposed at said cross pivot.

9. The towing device as set forth in claim 7 wherein said rear frame extends rearwardly past said support wheels, and said rear frame and first frame element are of substantially equal lengths and foldable about said cross pivot whereby the towing device may be stored in upright position with the support wheels out of ground support contact.

10. The towing device as set forth in claim 7 wherein the means constraining the front assembly of said motorcycle comprises front fork support elements adjustably movable along the length of said first frame element for contact with the front assembly of said motorcycle whereby motorcycles of various size may be accommodated.

11. The towing device as set forth in claim 10 wherein said clamp means are disposed at said cross pivot and are engaged to the main frame of said motorcycle and further comprising fasteners for joining said front fork support to the front assembly of said motorcycle whereby pivotal movement between said front frame element and rear frame about said cross pivot is limited and the towing device can alternately be used to carry said motorcycle when attached to the fifth wheel assembly and the towing vehicle or to conveniently move the motorcycle to storage positions when detached therefrom.

* * * * *